United States Patent
Chang et al.

(10) Patent No.: US 9,225,036 B2
(45) Date of Patent: Dec. 29, 2015

(54) ADDITIVE FOR ELECTROCHEMICAL ELEMENT TO IMPROVE SAFETY

(75) Inventors: Sung kyun Chang, Daejeon (KR); Hong-Kyu Park, Daejeon (KR); Sinyoung Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 50 days.

(21) Appl. No.: 12/843,471

(22) Filed: Jul. 26, 2010

(65) Prior Publication Data

US 2011/0070501 A1 Mar. 24, 2011

Related U.S. Application Data

(63) Continuation of application No. PCT/KR2010/002488, filed on Apr. 21, 2010.

(30) Foreign Application Priority Data

Apr. 21, 2009 (KR) .................. 10-2009-0034695

(51) Int. Cl.
| | |
|---|---|
| *H01M 4/62* | (2006.01) |
| *H01M 10/052* | (2010.01) |
| *H01M 2/34* | (2006.01) |
| *H01M 10/42* | (2006.01) |

(52) U.S. Cl.
CPC .............. *H01M 10/052* (2013.01); *H01M 2/34* (2013.01); *H01M 2/348* (2013.01); *H01M 4/622* (2013.01); *H01M 4/624* (2013.01); *H01M 4/625* (2013.01); *H01M 4/628* (2013.01); *H01M 10/4235* (2013.01); *Y02E 60/122* (2013.01); *Y02T 10/7011* (2013.01)

(58) Field of Classification Search
CPC ....... H01M 2/34; H01M 2/348; H01M 4/622; H01M 4/625; H01M 10/4235
See application file for complete search history.

(56) References Cited

U.S. PATENT DOCUMENTS

| | | | |
|---|---|---|---|
| 4,828,955 A | 5/1989 | Kasai et al. | |
| 5,821,012 A * | 10/1998 | McCullough | 429/209 |
| 6,770,369 B1 * | 8/2004 | Oyamada et al. | 428/403 |
| 2002/0155333 A1 | 10/2002 | Fitts et al. | |
| 2006/0030483 A1 * | 2/2006 | Jang | 502/400 |
| 2006/0292442 A1 | 12/2006 | Shah et al. | |
| 2008/0026283 A1 * | 1/2008 | Park et al. | 429/56 |
| 2008/0085453 A1 * | 4/2008 | Okuno et al. | 429/223 |
| 2010/0219382 A1 * | 9/2010 | Abe | 252/513 |

FOREIGN PATENT DOCUMENTS

| | | |
|---|---|---|
| EP | 1 035 606 A1 | 9/2000 |
| JP | 2001-332245 A | 11/2001 |
| KR | 10-2007-0008084 A | 1/2007 |
| KR | 10-0873564 B1 | 12/2008 |

* cited by examiner

*Primary Examiner* — Ladan Mohaddes

(74) *Attorney, Agent, or Firm* — Birch, Stewart, Kolasch & Birch, LLP

(57) ABSTRACT

Disclosed herein is an additive for improvement in safety of an electrochemical device, including an inner core and an outer coating layer, wherein the inner core is formed using a volume-expandable material fused at more than a predetermined temperature while the outer coating layer is formed using a conductive material with higher conductivity than that of the inner core and covers an outer face of the inner core. The disclosed additive rapidly increases resistance of the electrochemical device before ignition/explosion of the device caused by temperature rise, thereby effectively preventing ignition/explosion of the electrochemical device without deterioration in performance of the electrochemical device.

12 Claims, 2 Drawing Sheets

ADDITIVE FOR ELECTROCHEMICAL ELEMENT TO IMPROVE SAFETY

CROSS REFERENCE TO RELATED APPLICATIONS

This application is a Continuation of PCT International Application No. PCT/KR 2010/002488 filed on Apr. 21, 2010, which claims the benefit of Patent Application No. 10-2009-0034695 filed in Republic of Korea, on Apr. 21, 2009. The entire contents of all of the above applications is hereby incorporated by reference into the present application.

TECHNICAL FIELD

The present invention relates to an additive for improvement in safety of an electrochemical element and, more particularly, to an additive for an electrochemical element, which includes an inner core and an outer coating layer, wherein the inner core is formed using a volume-expandable material fused at a certain temperature or more while the outer coating layer is formed using a conductive material with higher conductivity than that of the inner core and covers an outer face of the inner core, so as to rapidly increase resistance of the electrochemical element before ignition and/or explosion thereof owing to temperature rise, thereby preventing ignition and/or explosion of the electrochemical element without deteriorating performance of the same.

BACKGROUND ART

With considerable increase in consumption of fossil fuels, demand for alternative energy or clean energy is rapidly increasing. As one form of such demand, electric power generation and storage technologies using electrochemical reaction are actively being studied.

A representative example of electrochemical elements using electrochemical energy is a secondary battery and application areas of the secondary battery are continuously increasing.

Demand for secondary batteries as an energy source is rapidly increasing and, especially, a lithium secondary battery having high energy density and voltage, long lifespan, reduced self-discharge rate, etc. among the secondary batteries is now commercialized and widely used in the related art. Recently, owing to considerable increase in demand for mobile electric/electronic devices, use of the secondary battery is also considerably expanded. In particular, lithium secondary batteries are also an important part of the foregoing environments.

Moreover, since mobile electric/electronic devices are continuously evolved into smaller and more functional forms, batteries used for such devices also require high performance, compactness and a variety of morphologies.

As to a laptop computer, a battery size significantly influences a thickness of the computer. Accordingly, in order to reduce a thickness of the laptop computer, a number of studies and experiments for development of various shapes of batteries as well as attaining high capacity and performance thereof are currently being conducted. Especially, as interest in environmental problems is increased, a great deal of research on electric vehicles and hybrid electric vehicles has been conducted in order to replace conventional automobiles using fossil fuels such as gas-oil vehicles, diesel vehicles, etc., which are a major cause of air pollution.

Although an anode active material for a lithium secondary battery has been generally prepared using a carbon material, lithium metal or sulfur compounds have also been proposed. As to cathode active materials for a lithium secondary battery, lithium containing cobalt oxide ($LiCoO_2$) is widely used. Additionally, other lithium transition metal oxides such as lithium containing manganese oxides such as $LiMnO_2$ with a lamellar crystal structure, $LiMn_2O_4$ with a spinel crystal structure, etc., and lithium containing nickel oxide ($LiNiO_2$) may also be used.

However, high energy density means possible exposure to risks and risks such as ignition, explosion, etc. may become more serious as energy density is increased. A lithium secondary battery as a major secondary battery has a drawback of inferior safety. For instance, when a battery is over-charged to about 4.2V, a cathode active material is degraded while dendrite growth of lithium metal and decomposition of an electrolyte may occur at an anode side. Furthermore, when excessive current flows in a short time due to over-charge, external short, nail penetration, local crushing, etc., the battery may be heated by IR heat generation, thus causing ignition/explosion thereof.

Increase in temperature of a battery promotes reaction between an electrolyte and an electrode. Then, heat of reaction is radiated, and the temperature of the battery is further increased, in turn accelerating the foregoing reaction. Owing to such a vicious circle, a phenomenon called thermal runaway, which is a very rapid temperature rise of the battery, may occur and battery ignition may be caused if the temperature increases to a certain level. As a result of the reaction between the electrolyte and the electrode, gas is also generated and internal pressure of the battery is increased, in turn causing battery explosion if the internal pressure reaches a certain level. Consequently, ignition/explosion risks as described above are a serious defect of conventional lithium secondary batteries.

Therefore, the most important consideration in development of improved lithium secondary batteries is to ensure safety. As a part of efforts to ensure safety of a battery, conventional techniques have been used and these are generally classified into a cell having an electric/electronic element fixed to an outer face thereof and use of materials contained in a cell. The electric/electronic element used in the former may include, for example, a PTC device using variation in temperature, a CID device, a protective circuit using variation in voltage, a safety vent using variation in internal pressure of a cell, etc. On the other hand, the latter may include addition of particular materials capable of being physically, chemically and/or electrochemically altered depending on variation in temperature and/or voltage of a cell.

Electric/electronic elements fixed to an outer face of a cell generally utilize temperature, voltage and/or internal pressure, thus being securely heat-shielded. However, such elements have disadvantages in that alternative assembly process and space are required and, for example, a CID device is employed only in a tubular cell. In addition, it is known that the foregoing elements are unsatisfactory to protect the cell under some conditions requiring fast response, that is, internal short, nail penetration, local crush, etc.

Alternatively, as to use of materials contained in a cell, a desirable additive may be added to an electrolyte or an electrode in order to improve safety thereof. A chemical safety device does not need additional assembly process or space and may be applicable to any type of batteries. However, due to addition of alternative materials, internal resistance of a cell is increased, in turn deteriorating cell performance.

Accordingly, there is still a strong requirement for development of a novel chemical safety method which can prevent ignition/explosion of a cell without deterioration in overall characteristics and/or performance thereof.

DISCLOSURE

Technical Problem

Therefore, the present invention is directed to solving conventional problems described above and to overcoming technical restrictions in related arts.

As a result of extensive studies and a number of experiments executed by the present inventors, an additive configured of an inner core and an outer coating layer as described below was developed and it was found that such an additive may considerably increase resistance of an electrochemical element before ignition/explosion thereof caused by temperature rise, thus effectively preventing ignition/explosion of the element without inhibiting performance of the same. Thereby, the present invention was successfully completed.

Technical Solution

Accordingly, the present invention provides an additive for improvement in safety of an electrochemical element (often, referred to as 'electrochemical device'), including an electrochemical device and an additive added thereto in order to improve safety of the device. In particular, this additive substantially comprises an inner core and an outer coating layer wherein the inner core is formed using a volume-expandable material fused at a constant temperature or more while the outer coating layer is formed using a conductive material with higher conductivity than that of the inner core and covers an outer face of the inner core.

The additive for an electrochemical device (abbrev. to 'electrochemical additive') of the present invention has the outer coating layer with a relatively high conductivity sufficient to inhibit deterioration in performance of the device, and may enable fusion of the inner core and volume expansion before ignition/explosion of the device due to temperature rise, so as to rapidly increase resistance of the device, thereby effectively preventing ignition/explosion of the device.

Hereinafter, the present invention will be described in detail.

Generally, excessive current may flow through an electrochemical device in a short time by overcharge, external short, nail penetration, local crushing, etc. and, in such a case, electrical heat may be generated. As to electrical heat generation, a heat amount may be defined by $I^2R$. When an electrochemical device is isolated from an external power source, "I" value may indicate movement of electrical energy accumulated inside the device.

For a secondary battery comprising a cathode, an anode, a separator and a lithium salt containing electrolyte, for example, if instantaneous electrical energy shift is increased by overcharge, external short, nail penetration, local crushing, etc. (that is, 'abnormal behavior state'), temperature may be sharply raised and reaction between the electrolyte and an electrode may be accelerated by increase in temperature of the battery. As a result, heat of reaction is generated and the temperature of the battery is further increased. These conditions further promote the reaction between the electrolyte and the electrode. If the temperature is raised to a certain level according to the foregoing subsequent steps, the battery may be ignited.

Therefore, in order to prevent a battery temperature from exceeding a normal temperature at which the battery is in a normal behavior state (referred to as 'a normal behavior temperature'), it is necessary to reduce the electrical energy shift inside the battery in an abnormal behavior state. This purpose may be accomplished by rapidly increasing internal resistance of the battery at a desired temperature or more.

The electrochemical additive of the present invention may rapidly increase internal resistance of an electrochemical device in an abnormal behavior state and reduce electrical energy shift inside the device, in turn inhibiting excessive temperature rise above a normal behavior temperature. This purpose may be accomplished using an inner core comprising a volume-expandable material fused at more than a predetermined temperature.

A temperature at which abnormal behavior of a battery is caused may be more than 100° C. and, preferably, more than 120° C. and the inventive additive exhibits expansion characteristics in the foregoing range of temperatures.

Such a volume-expandable material to form a core of an electrochemical additive with favorable characteristics described above may be a non-conductive polymer and examples thereof may include polyethylene, polypropylene, polystyrene, etc., although not particularly limited thereto. These materials may be used alone or as a combination of two or more thereof.

The inventive additive has a degree of expansion of at least 2 times and, preferably, 2.5 times an original volume. However, an upper limit of volume expansion is not particularly restricted.

Optionally, in order to derive significant volume expansion at more than the foregoing defined temperature, the inner core may further include a foaming agent. Such a foaming agent may be selected from available products in chemical industries and a desired content of the foaming agent may be suitably determined in consideration of a degree of expansion.

The volume-expandable material is non-conductive and, when adding the same to the electrochemical device, internal resistance is increased, thus causing deterioration in cell performance. Accordingly, as shown in FIG. 1, the electrochemical additive of the present invention includes an outer coating layer applied to an outer face of the inner core comprising the volume-expandable material wherein the outer coating layer is formed using a material with higher conductivity than that of the inner core.

The outer coating layer may have conductivity at least 10 times higher than that of the inner core and, thanks to higher conductivity of the outer coating layer, the inventive electrochemical additive added to an electrochemical device may not induce increase in internal resistance of the electrochemical device at a normal behavior temperature thereof.

The outer coating layer may comprise different materials and, preferably, at least one selected from a group consisting of carbon materials, electron-conductive metals, electron-conductive inorganic materials and electron-conductive polymers.

The carbon materials may be selected from a group consisting of carbon black, acetylene black and super-P. The electron-conductive metals may include, for example, at least one selected from Cu, Ag, Pt and Ni. The electron-conductive inorganic materials may include, for example, at least one selected from a group consisting of indium-tin oxide ($In_2O_3SnO_2$), tin oxide ($SnO_2$), zinc oxide (ZnO), ruthenium oxide ($RuO_2$) and $TiB_2$. The electron-conductive polymer may include, for example, at least one selected from a group consisting of polypyrrole, polyaniline, polythiophene and polyacetylene.

The electrochemical additive having the foregoing outer coating layer of the present invention does not maintain increase in internal resistance at a normal behavior temperature of an electrochemical device when the additive is added to the electrochemical device, whilst the internal resistance is rapidly increased at more than a predetermined temperature, thus ensuring safety of the electrochemical device.

For this purpose, the volume-expandable material of the inner core in the above additive is fused and expanded at more than a predetermined temperature and, owing to such volume expansion, the outer coating layer covering a surface of the inner core is broken and the volume-expandable material is discharged.

The discharged volume-expandable material is substantially non-conductive and induces increase in internal resistance of the electrochemical device, that is, a secondary battery, in turn inhibiting mobility of ions used for behavior of the battery.

Briefly, a volume-expandable material is discharged by breaking the outer coating layer before ignition/explosion of an electrochemical device caused by abnormal temperature rise, so as to rapidly increase resistance of the electrochemical device, thus effectively preventing ignition/explosion of the electrochemical device without deterioration in performance thereof in a normal behavior temperature range.

A thickness of the outer coating layer in the electrochemical additive according to the present invention is substantially determined in consideration of the size of the inner core and may range from 0.5 to 50% in terms of a diameter of the inner core.

If the thickness of the outer coating layer is too large, it is difficult for the inner core to break the outer coating layer and discharge the volume-expandable material. On the other hand, when the outer coating layer is too thin, the additive may not have desired conductivity even under normal behavior conditions. Therefore, the thickness of the outer coating layer may range from 50 to 150 nm and, preferably, may be about 100 nm.

Morphologies of the inner core are not particularly restricted and may be a spherical shape.

Different methods may be employed to apply an outer coating layer to an outer face of an inner core and, preferably, include a mechanical mixing process. If expandable particles of the inner core are admixed with a conductive material of the outer coating layer by the mechanical mixing process, electrostatic attraction enables coating of the inner core with the outer coating layer. For instance, when polyethylene particles in an inner core layer are admixed with carbon of an outer coating layer by mechanical mixing, carbon is uniformly dispersed throughout a surface of the polyethylene particles thanks to electrostatic attraction, thus completing formation of the outer coating layer.

The mechanical mixing process may be any one selected from ball milling, mechano-fusion and Nobilta mode, however, is not particularly limited thereto.

The present invention also provides an electrochemical device including the foregoing additive.

With regard to an electrochemical device including a cathode, an anode, a separator and an electrolyte, the additive may be introduced into the cathode, the anode, the separator, the electrolyte, an inner face of a device housing, an empty space inside the device, and so forth.

A content of the additive may depend on positions of the device. For example, if the additive is added to an electrode or an electrolyte, the content may range from 0.1 to 10 wt. % relative to a total weight of the electrode or electrolyte. In the case where the additive is coated along the inner face of a device housing, a coating thickness sufficient to provide desired safety may be preferable.

The electrochemical device may be, for example, a lithium ion battery, a lithium polymer battery, a lithium ion polymer battery, a nickel-hydrogen battery, a nickel-cadmium battery, an organic radical battery, a lead acid battery, an air secondary battery, a nickel-zinc battery, a silver-zinc battery or a capacitor and, preferably, a lithium secondary battery.

The lithium secondary battery may comprise, for example, a cathode, an anode, a separator and a non-aqueous electrolyte containing lithium salt.

The cathode is fabricated by, for example, applying a mixture of the cathode active material, a conductive material and a binder to a cathode collector and drying the coated collector. Optionally, a filler may be added to the mixture. The anode is fabricated by applying an anode active material to an anode collector and drying the coated collector and, if necessary, may further contain the foregoing ingredients.

The anode active material may include, for example: carbon and graphite materials such as natural graphite, artificial graphite, expandable graphite, carbon fiber, hard carbon, carbon black, carbon nanotubes, fullerene, activated carbon, etc.; metals alloyable with lithium such as Al, Si, Sn, Ag, Bi, Mg, Zn, In, Ge, Pb, Pd, Pt, Ti, etc. and compounds containing the same; composites of metals and compounds thereof with carbon and graphite materials; lithium containing nitrides, and so forth. Among these, carbon based active materials, silicon based active materials, tin based active materials, and/or silicon-carbon based active materials are more preferable and may be used alone or in combination of two or more thereof.

The separator is interposed between the cathode and the anode and consists of a thin insulation film having high ion permeability and excellent mechanical strength. A diameter of each pore in the separator generally ranges from 0.01 to 10 μm and a thickness thereof generally ranges from 5 to 300 μm. Such separator may be fabricated using a sheet or non-woven fabric made of, for example, an olefin polymer such as polypropylene having chemical resistance and hydrophobicity, glass fiber or polyethylene. When a solid electrolyte such as a polymer electrolyte is used, this electrolyte may also serve as the separator.

The binder may include, for example: polyvinylidene fluoride; polyvinyl alcohol; carboxymethyl cellulose (CMC); starch; hydroxypropyl cellulose; regenerated cellulose; polyvinyl pyrrolidone; tetrafluoroethylene; polyethylene; polypropylene; ethylene-propylene-diene terpolymer (EPDM); sulfonated EPDM; styrene-butylene rubber; fluorine rubber; different copolymers; high saponification polyvinyl alcohol, and the like.

The conductive material is used to improve conductivity of the electrode active material and may be added in an amount of 1 to 30 wt. % relative to a total weight of an electrode mixture. The conductive material is not particularly restricted so long as it exhibits conductivity while not causing chemical change of a battery. For example, the conductive material may comprise: graphite such as natural graphite or artificial graphite; carbon black such as carbon black, acetylene black, ketchen black, channel black, furnace black, lamp black, summer black, etc.; a conductive fiber such as carbon derivatives including carbon nanotubes or fullerenes, carbon fiber, metal fiber, etc.; metal powder such as carbon fluoride, aluminum or nickel powder; a conductive whisker such as zinc oxide, potassium titanate, etc.; conductive metal oxide such as titanium oxide; a conductive material such as polyphenylene derivative, and the like.

A viscosity controlling agent refers to a component regulating viscosity of an electrode mixture in order to help processes for blending and applying the electrode mixture to a collector to be more easily performed. The viscosity controlling agent is preferably added in an amount of up to 30 wt. % relative to a total weight of the electrode mixture. Examples of such viscosity controlling agent may include carboxymethyl cellulose, polyvinylene fluoride, etc., although not duly limited thereto. Optionally, the foregoing solvents may also serve as a viscosity controlling agent.

The filler used herein is an additional component to inhibit expansion of an electrode and is not particularly limited so long as it comprises fibrous materials without causing chemical change of a battery. For example, the filler may be formed using olefin based polymer such as polyethylene, polypropylene, etc. or a fibrous material such as glass fiber, carbon fiber, etc.

A coupling agent is another additional component to increase adhesion between an electrode active material and a binder, characterized in having at least two functional groups, and may be used in an amount of up to 30 wt. % relative to a weight of the binder. An example of such coupling agent may be a material having at least two functional groups wherein one of the functional groups reacts with a hydroxyl or carboxyl group present on a surface of silicon, tin or graphite based active material to form a chemical bond while another functional group reacts with a polymer binder to form another chemical bond. A preferred example of the coupling agents may be a silane based coupling agent including: triethoxysilylpropyl tetrasulfide; mercaptopropyl triethoxysilane; aminopropyl triethoxysilane; chloropropyl triethoxysilane; vinyl triethoxysilane; methacryloxypropyl triethoxysilane; glycidoxypropyl triethoxysilane; isocyanatopropyl triethoxysilane; cyanatopropyl triethoxysilane, etc., although not particularly limited thereto.

An adhesion promoter used herein is an additional component to improve adhesion of an active material to a collector and may be added in an amount of not more than 10 wt. % relative to the binder. Examples of the adhesion promoter may include oxalic acid, adipic acid, formic acid, acrylic acid derivatives, itaconic acid derivatives, and the like.

A molecular weight controller may include, for example, t-dodecylmercaptan, n-dodecylmercaptan, n-octylmercaptan, etc. A cross-linking agent may include, for example, 1,3-butanediol diacrylate, 1,3-butanediol dimethacrylate, 1,4-butanediol diacrylate, 1,4-butanediol dimethacrylate, aryl acrylate, aryl methacrylate, trimethylolpropane triacrylate, tetraethyleneglycol diacrylate, tetraethyleneglycol dimethacrylate, divinylbenzene, and the like.

The collector of the electrode is a part in which electrons move during electrochemical reaction of the active material and, based on types of the electrode, may be classified into an anode collector and a cathode collector.

The anode collector is generally fabricated with a thickness of 3 to 500 µm. So long as the anode collector exhibits conductivity and does not cause chemical change of a battery, materials of the anode collector are not particularly restricted and may include, for example, copper, stainless steel, aluminum, nickel, titanium, calcined carbon, copper or stainless steel surface-treated with carbon, nickel, titanium, silver, etc., or aluminum-cadmium alloy, and so forth.

The cathode collector is generally fabricated with a thickness of 3 to 500 µm. So long as the cathode collector exhibits high conductivity and does not cause chemical change of a battery, materials of the cathode collector are not particularly restricted and may include, for example, stainless steel, aluminum, nickel, titanium, calcined carbon, or aluminum or stainless steel surface-treated with carbon, nickel, titanium, silver, etc.

The collector may form fine unevenness on a surface thereof in order to reinforce binding of an electrode active material and be utilized in different forms such as a film, a sheet, a foil, a net, a porous body, a foam, a non-woven fabric, and the like.

The lithium containing non-aqueous electrolyte used herein may comprise a non-aqueous electrolyte and a lithium salt.

The foregoing non-aqueous electrolyte may be an aprotic solvent including, for example: N-methyl-2-pyrrolidinone; propylene carbonate; ethylene carbonate; butylene carbonate; dimethyl carbonate; diethyl carbonate; γ-butyrolactone; 1,2-dimethoxyethane; tetrahydroxyfuran; 2-methyl tetrahydrofuran; dimethylsulfoxide; 1,3-dioxolane; formamide; dimethylformamide; dioxolane; acetonitrile; nitromethane; methyl formate; methyl acetate; phosphoric triester; trimethoxy methane; dioxolane derivatives; sulfolane; methyl sulfolane; 1,3-dimethyl-2-imidazolidinone; propylene carbonate derivatives; tetrahydrofuran derivatives; ether; methyl propionate; ethyl propionate, etc.

The lithium salt used herein is a substance easily dissolved in the non-aqueous electrolyte and examples thereof may include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, lower aliphatic carboxylic acid lithium, lithium tetraphenylborate, imides, etc.

Optionally, an organic solid electrolyte or an inorganic solid electrolyte may be used.

The organic solid electrolyte may include, for example, polyethylene derivatives, polyethylene oxide derivatives, polypropylene oxide derivatives, phosphoric ester polymer, poly agitation lysine, polyester sulfide, polyvinyl alcohol, polyvinylidene fluoride, and a polymer having ionic dissociation groups.

The inorganic solid electrolyte may include Li nitrides, halides, sulfates, etc., for example, Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, Li$_3$PO$_4$—Li$_2$S—SiS$_2$, and the like.

For improvement of charge-discharge features and/or flame retardancy, the non-aqueous electrolyte may further include, for example, pyridine, triethyl phosphite, triethanolamine, cyclic ether, ethylenediamine, n-glyme, hexaphosphoric triamide, a nitrobenzene derivative, sulfur, quinone imine dye, N-substituted oxazolidinone, N,N-substituted imidazolidine, ethyleneglycol dialkylether, ammonium salt, pyrrol, 2-methoxy ethanol, aluminum trichloride, etc. Optionally, the electrolyte may include a halogen solvent such as carbon tetrachloride, ethylene trifluoride, etc. to provide non-flammability and/or CO$_2$ gas to improve high temperature preservation of the electrolyte. Moreover, fluoroethylene carbonate (FEC), propene sultone (PRS), fluoroethylene carbonate (FEC), etc. may be further added.

A lithium secondary battery of the present invention may be fabricated according to any conventional method known in related arts. As to the inventive lithium secondary battery, configurations of the cathode, anode and separator are not particularly restricted and, for example, each sheet may be placed in a circular, angular or pouch type case in a winding or stacking form.

The lithium secondary battery according to the present invention may be employed in various devices requiring excellent rate properties and high temperature stability, for example: a power tool driven by an electric motor; an electric automobile such as an electric vehicle (EV), hybrid electric vehicle (HEV), plug-in hybrid electric vehicle (PHEV), etc.;

an electric two-wheel vehicle such as an E-bike, E-scooter, etc.; an electric golf cart, and so forth, without particular limitation.

Advantageous Effects

As described above, an additive for an electrochemical device of the present invention comprises an inner core and an outer coating layer wherein the inner core is formed using a volume-expandable material fused at more than a predetermined temperature, while the outer coating layer is formed using a material having higher conductivity than that of the inner core and covers an outer face of the inner core, so as to rapidly increase resistance of the electrochemical device before ignition and/or explosion thereof owing to temperature rise, thereby preventing ignition and/or explosion of the electrochemical device without deteriorating performance of the same.

BRIEF DESCRIPTION OF THE DRAWINGS

The above and other objects, features and other advantages of the present invention will be more clearly understood from the following detailed description taken in conjunction with the accompanying drawings, in which.

BEST MODE

Hereinafter, exemplary embodiments of the present invention will be described in greater detail with reference to the following examples. However, those skilled in the art will appreciate that these embodiments are proposed for illustrative purpose only and do not restrict the scope of the present invention.

Preparative Example 1

Figure 1:
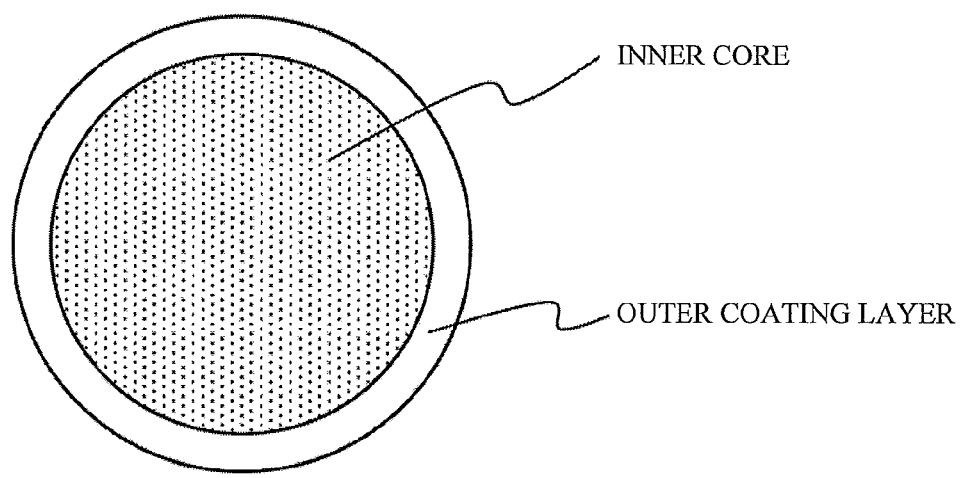
FIG. 1 is a schematic cross-sectional view illustrating an additive for an electrochemical device of the present invention.
Figure 2:
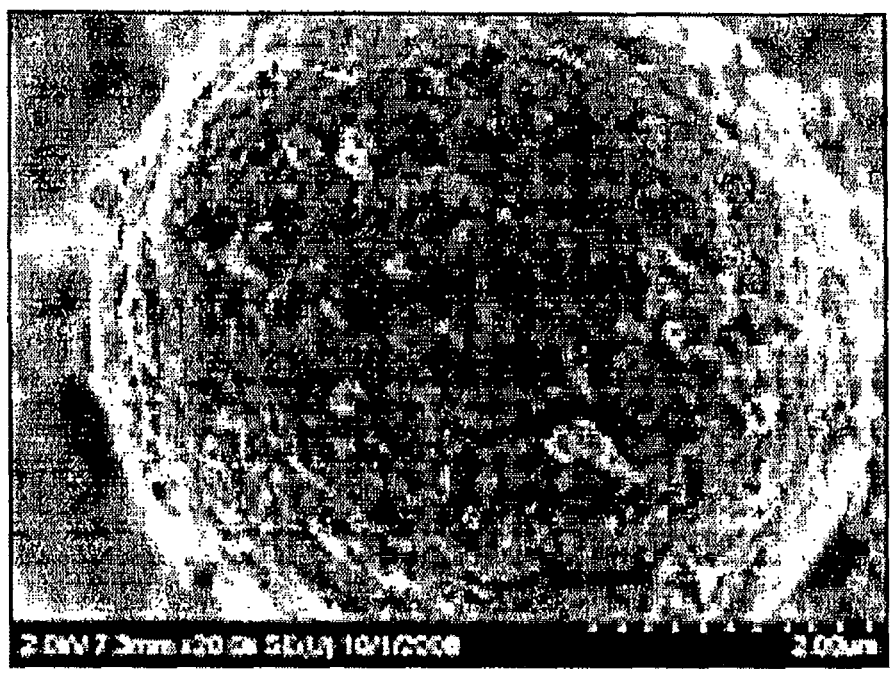
FIG. 2 is a photograph showing an electrochemical additive comprising a carbon coating layer as well as a polymer core prepared in Preparative Example 1.

As an expandable material, polyethylene powder was admixed with carbon powder in a relative ratio by weight of 2:1. The mixture was subjected to ball-milling for at least 12 hours to prepare the polyethylene powder coated with carbon at a surface thereof, in turn providing an electrochemical additive as a final product. As shown in FIG. 2, it was found that an inner core comprising polyethylene was coated with carbon powder at a surface thereof.

Example 1

After admixing a cathode material with Super P as a conductive material and polyvinylidene fluoride as a binder in a relative ratio by weight of 92:4:4, N-methyl pyrrolidone (NMP) was added to the mixture to prepare a slurry. The obtained cathode slurry was applied to an aluminum collector, followed by drying in a vacuum oven at 120° C., thus forming a cathode.

As to formation of an anode, Mesocarbon microbeads (MCMB), Super P and PVdF were used as an active material, a conductive material and a binder, respectively. Three materials were admixed in a relative ratio by weight of 92:2:6, dispersed in NMP and applied to a copper foil, thereby forming an anode.

By interposing a porous separator between the cathode and the anode fabricated above, an electrode assembly was fabricated. After placing the electrode assembly in a pouch type housing and connecting electrode leads thereto, the electrochemical additive prepared in Preparative Example 1 was added to a solution, which comprises ethylene carbonate (EC) and dimethyl carbonate (DMC) dissolved in a volume ratio of 1:1 in 1M $LiPF_6$, in an amount of 5 wt. % relative to a total weight of an electrolyte. The solution was introduced into the electrolyte and securely sealed, followed by assembly into a lithium secondary battery.

Example 2

A lithium secondary battery was fabricated by the same procedure as described in Example 1, except that 5 wt. % of the electrochemical additive was added to a cathode material during preparation of a cathode slurry, in place of the electrolyte.

Comparative Example 1

A lithium secondary battery was fabricated by the same procedure as described in Example 1, except that the battery did not contain the electrochemical additive.

Comparative Example 2

Figure 3:
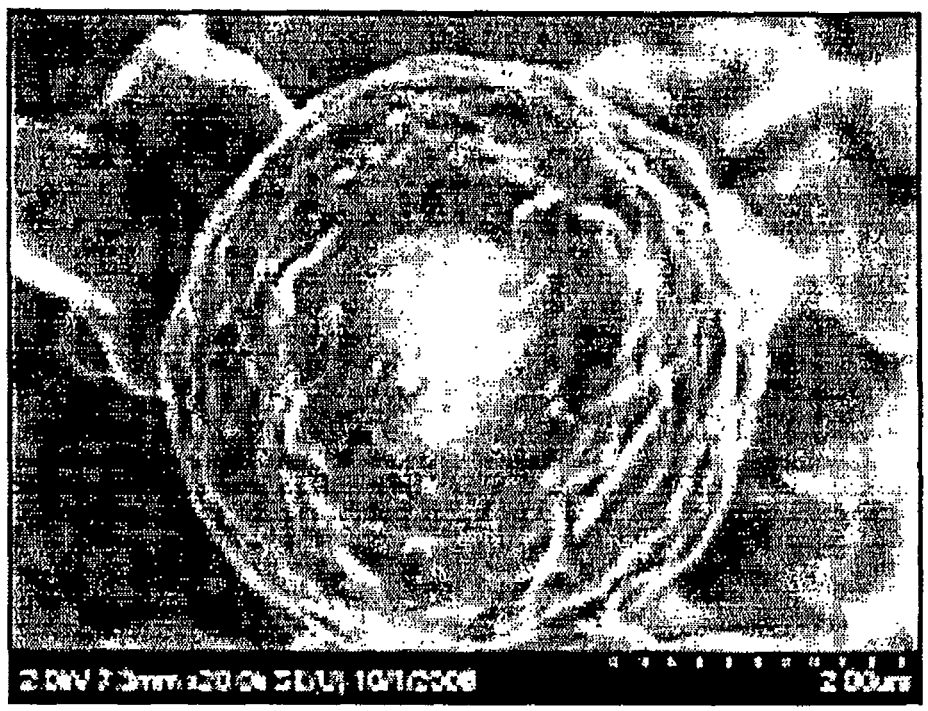
FIG. 3 is a photograph showing another additive comprising polymer alone used in Comparative Example 1.

A lithium secondary battery was fabricated by the same procedure as described in Example 1, except that polyethylene particles were added to the electrolyte. A shape of the polyethylene particles is shown in FIG. 3.

Experimental Example 1

For each of the batteries fabricated in Examples 1 and 2, as well as Comparative Examples 1 and 2, a nail test was conducted and results thereof are shown in TABLE 1 below.

TABLE 1

|  | Additive containing site | Content (wt %) | Explosion |
| --- | --- | --- | --- |
| Example 1 | Electrolyte | 5 | X |
| Example 2 | Cathode material | 5 | X |
| Comparative Example 1 | — | — | O |
| Comparative Example 2 | Electrolyte | 5 | X |

As shown in TABLE 1, it was found that explosion of a battery does not occur if the electrochemical additive of the present invention is added to an electrolyte or a cathode material, in an amount of 5 wt. % relative to a total weight of the electrolyte or cathode material, then used in manufacturing the battery. In contrast, a control battery fabricated in Comparative Example 1 without the inventive electrochemical additive has been exploded during the nail test.

Further, when a battery does not have a conductive outer coating layer as described in Comparative Example 2, explosion was not observed during the nail test. However, compared to Examples 1 and 2, the battery of Comparative Example 2 exhibited deteriorated performance due to high internal resistance.

Although the preferred embodiments of the present invention have been disclosed for illustrative purposes, those skilled in the art will appreciate that various applications and modifications are possible on the basis of the above detailed description, without departing from the scope and spirit of the invention as disclosed in the accompanying claims.

The invention claimed is:

1. An electrochemical device comprising a cathode, an anode, a separator and an electrolyte,
wherein the electrochemical device includes an additive introduced into at least one selected from a group consisting of the cathode, the anode, the separator, the electrolyte, a housing device and an empty space inside the electrochemical device for improvement in safety of the electrochemical device,
wherein the additive comprises a particle having a spherical shape, said particle comprising an inner core and an outer coating layer present on a surface of the inner core,
wherein the inner core is formed using a volume-expandable material fused at a temperature of more than 100° C. while the outer coating layer is formed using a conductive material with higher conductivity than that of the inner core and covers an outer face of the inner core,
wherein the outer coating layer comprises at least one or more selected from a group consisting of carbon materials, electron-conductive inorganic materials and electron-conductive polymer,
wherein a thickness of the outer coating layer ranges from 0.5 to 50% of the size of the inner core and the thickness of the outer coating layer ranges from 50 to 150 nm,
wherein the carbon materials are selected from the group consisting of carbon black, acetylene black and super-P,
wherein the electron-conductive inorganic materials are selected from the group consisting of indium-tin oxide ($In_2O_3SnO_2$), tin oxide ($SnO_2$), zinc oxide ($ZnO$), ruthenium oxide ($RuO_2$) and $TiB_2$, and
wherein the electron-conductive polymer is selected from the group consisting of polypyrrole, polyaniline, polythiophene and polyacetylene.

2. The electrochemical device according to claim 1, wherein the outer coating layer has a conductivity of at least 10 times a conductivity of the inner core.

3. The electrochemical device according to claim 1, wherein the additive becomes expandable at a temperature of more than 100° C.

4. The electrochemical device according to claim 3, wherein a degree of expansion of the additive is at least two times an original volume.

5. The electrochemical device according to claim 1, wherein the volume-expandable material is a non-conductive polymer.

6. The electrochemical device according to claim 1, wherein the volume-expandable material is at least one or more selected from a group consisting of polyethylene, polypropylene and polystyrene.

7. The electrochemical device according to claim 1, wherein the volume-expandable material of the inner core is configured of polymer and a foaming agent.

8. The electrochemical device according to claim 1, wherein when the volume-expandable material of the inner core is fused and expands at more than a predetermined temperature, the expanded material is discharged by breaking the outer coating layer enclosing a surface of the inner core.

9. The electrochemical device according to claim 1, wherein the additive exhibits increase in resistance at more than a predetermined temperature.

10. The electrochemical device according to claim 1, wherein the volume-expandable material of the inner core in the electrochemical device is discharged out of the outer coating layer at a temperature of more than 100° C., so as to rapidly increase resistance of the electrolyte inside the electrochemical device.

11. The electrochemical device according to claim 1, wherein the electrochemical device is a lithium secondary battery.

12. An electrochemical device comprising a cathode, an anode, a separator and an electrolyte,
wherein the electrochemical device includes an additive introduced into at least one selected from a group consisting of the cathode, the anode, the separator, the electrolyte, a house device and an empty space inside the electrochemical device for improvement in safety of the electrochemical device,
wherein the additive comprises a particle having a spherical shape, said particle comprising an inner core and an outer coating layer present on a surface of the inner core,
wherein the inner core is formed using a volume-expandable material fused at a temperature of more than 100° C. while the outer coating layer is formed using a conductive material with higher conductivity than that of the inner core and covers an outer face of the inner core,
wherein the outer coating layer comprises at least one or more selected from a group consisting of carbon materials, electron-conductive inorganic materials and electron-conductive polymer,
wherein the carbon materials are selected from the group consisting of carbon black, acetylene black and super-P,
wherein the electron-conductive inorganic materials are selected from the group consisting of indium-tin oxide ($In_2O_3SnO_2$), tin oxide ($SnO_2$), zinc oxide ($ZnO$), ruthenium oxide ($RuO_2$) and $TiB_2$, and
wherein the electron-conductive polymer is selected from the group consisting of polypyrrole, polyaniline, polythiophene and polyacetylene.

* * * * *